US011938647B2

(12) United States Patent
Gulminelli

(10) Patent No.: US 11,938,647 B2
(45) Date of Patent: Mar. 26, 2024

(54) DEVICE FOR CUTTING TUBES OF THERMOPLASTIC MATERIAL

(71) Applicant: SICA S.p.A., Alfonsine (IT)

(72) Inventor: Marco Gulminelli, Ravenna (IT)

(73) Assignee: SICA S.P.A., Alfonsine Ravenna (IT)

( * ) Notice: Subject to any disclaimer, the term of this patent is extended or adjusted under 35 U.S.C. 154(b) by 0 days.

(21) Appl. No.: 17/800,681

(22) PCT Filed: Feb. 23, 2021

(86) PCT No.: PCT/IB2021/051509

§ 371 (c)(1),
(2) Date: Aug. 18, 2022

(87) PCT Pub. No.: WO2021/181187

PCT Pub. Date: Sep. 16, 2021

(65) Prior Publication Data

US 2023/0347539 A1 Nov. 2, 2023

(30) Foreign Application Priority Data

Mar. 9, 2020 (IT) ........................ 102020000004888

(51) Int. Cl.
*B26D 3/16* (2006.01)
*B26D 1/58* (2006.01)
*B26D 5/08* (2006.01)

(52) U.S. Cl.
CPC ................. *B26D 3/16* (2013.01); *B26D 1/58* (2013.01); *B26D 5/086* (2013.01)

(58) Field of Classification Search
CPC ............. B26D 3/16; B26D 1/58; B26D 5/086
USPC ........................................................... 83/563
See application file for complete search history.

(56) References Cited

U.S. PATENT DOCUMENTS 3,771,393 A * 11/1973 Gatto ..................... B23D 47/10 408/124
4,084,463 A * 4/1978 Kanbara .................. B26D 3/16 82/53.1
6,009,780 A * 1/2000 Savioli ..................... B26D 3/16 83/184
11,541,564 B2 * 1/2023 Gulminelli ............... B26D 5/06
(Continued)

FOREIGN PATENT DOCUMENTS

WO 2019244015 A2 12/2019

OTHER PUBLICATIONS

International Search Report and Written Opinion dated May 31, 2021 from counterpart International Patent Application No. PCT/IB2021/051509.

*Primary Examiner* — Omar Flores Sanchez
(74) *Attorney, Agent, or Firm* — SHUTTLEWORTH & INGERSOLL, PLC; Timothy J. Klíma

(57) ABSTRACT

An apparatus for cutting pipes made of thermoplastic material, including: a tool for cutting pipes, an arm for supporting the tool which is movable between a non-operating configuration wherein the tool is disengaged from the pipe and an operating configuration wherein the tool is engaged in the pipe to exert a cutting action on the pipe, a lever which can be constrained to the arm, supporting device configured to move said lever, a locking unit for reversibly constraining said arm and said lever and disengaging means to move said arm from the operating configuration to the non-operating configuration.

12 Claims, 8 Drawing Sheets

(56) References Cited

U.S. PATENT DOCUMENTS

| | | | | |
|---|---|---|---|---|
| 2011/0100638 | A1* | 5/2011 | Ramfjord | B23D 45/126 |
| | | | | 166/361 |
| 2021/0122074 | A1* | 4/2021 | Gulminelli | B26D 5/06 |

* cited by examiner

DEVICE FOR CUTTING TUBES OF THERMOPLASTIC MATERIAL

This application is a National Phase of International Application PCT/IB2021/051509 filed Feb. 23, 2021 which designated the U.S.

This application claims priority to Italian Patent Application No. 102020000004888 filed Mar. 9, 2020, which application is incorporated by reference herein.

TECHNICAL FIELD

This invention relates to an apparatus for cutting pipes of thermoplastic material. In particular, the invention relates to an apparatus for cutting pipes made of thermoplastic material installed in automatic cutter machines.

BACKGROUND ART

In the systems for producing pipes made of thermoplastic material, the automatic cutter machines are normally positioned in line with an extrusion station which produces a continuous pipe, more specifically downstream of the latter.

Automatic cutter machines typically have a cutting unit or apparatus equipped with one or more respective cutting tools.

Typically, the cutting unit or apparatus is movable in a rotary direction about the pipe.

According to preferred embodiments, during the cutting step, the cutting apparatus moves synchronously with the feeding of the pipe along its longitudinal axis.

During the cutting step, the cutting tool is fed radially until it comes into contact with the pipe to penetrate the thickness.

At the same time, the cutting unit rotates about the axis of the pipe so that the cutting tool can make a complete circumferential cut, forming in this way a piece of pipe.

Once a cut has been made, the cutting tool is moved away radially from the pipe so that there is no longer contact between the cutting tool and the profile of the pipe.

Subsequently, the cutting apparatus is returned longitudinally in the opposite direction to the feed direction of the pipe to a suitable starting position for making a new cut.

The tools commonly used for cutting pipes are represented by fixed blades, rotating idle blades or also circular blades rotating by means of suitable drive motors.

The cutting tool is selected as a function of the characteristics of the pipe to be cut, both in terms of material constituting the pipe and in terms of the thickness to be cut.

The prior art devices for moving cutting tools have a pneumatic or hydraulic drive.

More specifically, the hydraulic actuation requires a quite complex and bulky system, normally comprising a control unit with control valves, one or more electric motors, a tank and a hydraulic pump.

In operational terms, with the cutting machines currently in use, there is a problem linked with the adoption of the above-mentioned hydraulic drive of the cutting elements, in particular in the presence of faults or electricity supply failures.

In effect, as mentioned, the cutting means move longitudinally in synchrony with the pipe during the cutting step, penetrating inside it.

In the event of a power supply failure or an emergency shutdown of the automatic cutter machine, the pipe, pushed by the action of the extrusion station, continues to feed longitudinally at least for a predetermined time.

However, the cutting apparatus, no longer having the energy necessary for the suitable movements, is no longer able to disengage radially from the pipe, ending with it being pulled by the pipe itself.

Under the dragging action of the pipe, the cutting tool and the automatic cutter machine in general risk being damaged, adversely affecting the possibility of using new cuts.

The solutions currently designed to overcome this drawback involve the use of elastic elements coupled to the hydraulic cylinder which controls the radial movement of the cutting means relative to the profile of the pipe.

These elastic elements (typically compression springs) are compressed by the same hydraulic cylinder when the cutting element is pushed to penetrate the pipe being processed.

In the case of an electrical power failure, and therefore hydraulic, the cylinder is no longer able to compress the springs to which it is coupled and the latter are therefore free to release the relative accumulated elastic energy, withdrawing the cutting tool from the pipe.

Alternatively, a similar result may be achieved by inserting, in place of the springs, a suitable hydraulic accumulation device, which is loaded under normal operating conditions with the aim of introducing, if necessary, the accumulated pressurised oil in the circuit, inducing the moving away of the cutting tool from the pipe even in the absence of electrical energy.

The above-mentioned solutions have some drawbacks, in particular with regard to their complexity, which is in addition to that of a primary hydraulic system which is already very articulated.

Moreover, for some materials and specific cutting processes it is convenient to be able to control the speed, force and trajectory of perforation of the tool.

However, in order to guarantee certain features in the systems currently used, specific proportional hydraulic valves must be inserted and dedicated algorithms for controlling them must be processed.

Despite the presence of these additional components, it is not possible to reach high levels of precision due to the inevitable response inertias typical of hydraulic systems.

To this must also be added the behaviour variability which the hydraulic systems have as a function of the operating conditions, such as, for example, the temperature.

Patent document WO 2019/244015 A2 describes an apparatus for cutting pipes made of plastic material in automatic cutter machines, comprising a tool for cutting pipes made of plastic material, a first rocker arm supporting the cutting tool, movable between a non-operating configuration at which the tool is disengaged from the pipe and an operating configuration wherein the tool is designed to exert its cutting action on the pipe, a second arm, for controlling the first arm, operatively connected to the first arm for moving it at least between its non-operating and operating configurations, the second arm comprising a first electric actuator and a supporting body slidably connected for modifying its reciprocal position between a close position and a spaced-apart position.

DISCLOSURE OF THE INVENTION

The aim of the invention is to overcome the drawbacks of the prior art by means of an apparatus for cutting pipes made of thermoplastic material which is at the same time effective, precise, easy to control.

Another aim of the invention is to provide a cutting apparatus which is able to deactivate instantaneously if there is a power failure or if there are emergency conditions, allowing a disengagement of the cutting tool from the pipe being processed so as not to damage the cutting tools and, in general, the cutting machine in which it is installed.

Another aim of the invention is to provide a cutting apparatus comprising a limited number of components, which is therefore particularly compact and inexpensive.

These aims and others, which are more apparent in the description which follows, are achieved, in accordance with this invention, by an apparatus for cutting pipes made of thermoplastic material comprising the technical features described in one or more of the appended claims.

BRIEF DESCRIPTION OF DRAWINGS

The technical features of the invention, with reference to the above aims, are clearly described in the claims below and its advantages are more apparent from the detailed description which follows, with reference to the accompanying drawings which illustrate a preferred, non-limiting embodiment of the invention by way of example and in which:

DETAILED DESCRIPTION OF PREFERRED EMBODIMENTS OF THE INVENTION

Figure 1:
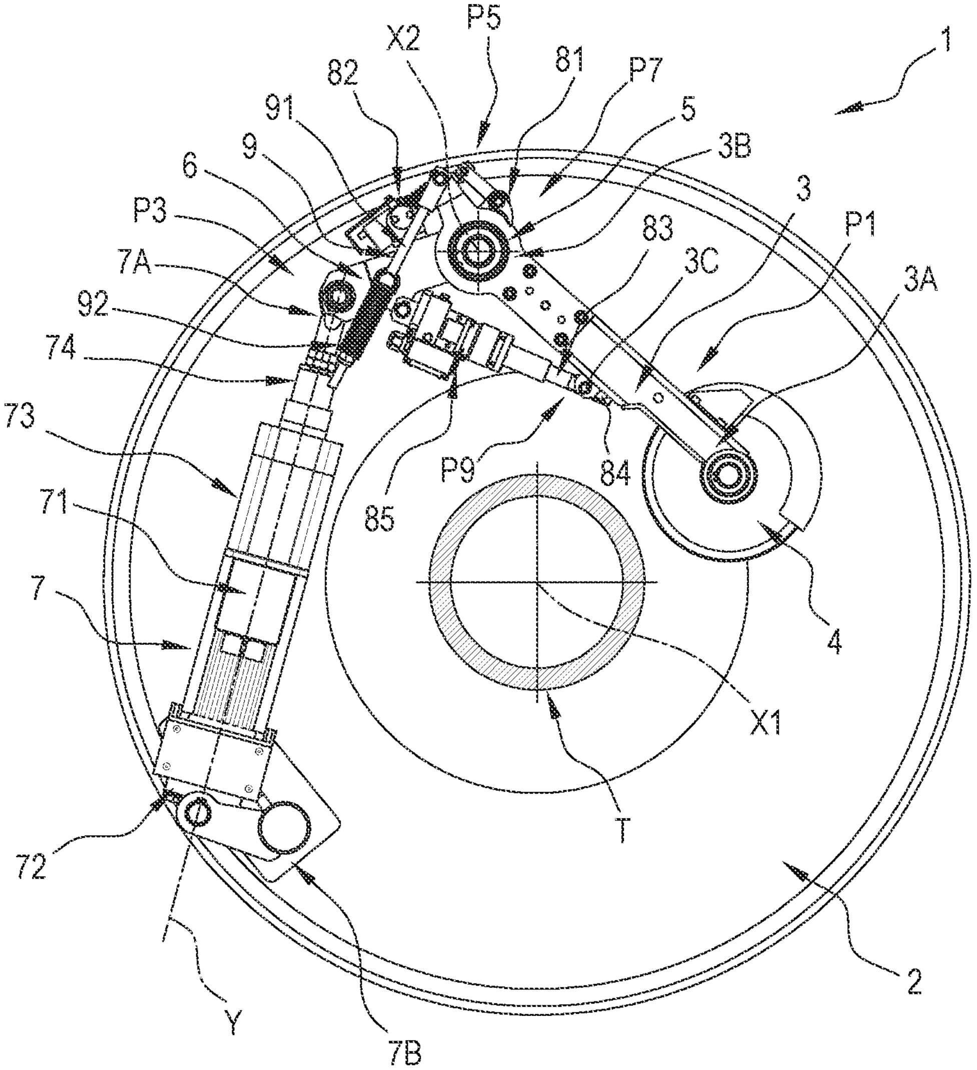
FIGS. 1 and 2 are front views of the cutting apparatus in an embodiment in two operating configurations during the cutting routine.

With reference to FIG. 1, the numeral 1 denotes in its entirety an apparatus for cutting a pipe T made of thermoplastic material.

The cutting apparatus 1 is normally inserted in an automatic cutter machine, not illustrated, in a system for forming pipes T made of thermoplastic material, also not illustrated.

Generally, the automatic cutter machines are positioned downstream of a continuous extrusion station and are designed for cutting pieces of pipe starting from a continuous pipe T coming from the above-mentioned extrusion station.

The pipe T made of thermoplastic material, coming in a continuous fashion from the extrusion station, is cut into pieces of predetermined size.

The cutting apparatus 1 is supported by a rotatable structure 2 of the cutting machine.

Preferably, the rotating structure 2 has an annular shape having a central hole in which the pipe T to be cut is positioned.

The rotatable structure 2 is configured to rotate, in a substantially known manner, about a first central axis X1 of rotation.

As will be explained in more detail below, other components of the cutting apparatus 1 are connected to the rotatable structure 2 and are rotationally driven by the movement of the above-mentioned structure 2.

Preferably, said first axis X1 substantially coincides with the longitudinal axis of symmetry of the pipe T coming from the above-mentioned extrusion station and is perpendicular to the plane of FIGS. 1 to 7.

Advantageously, during the cutting operations, the cutting apparatus 1 is movable along the above-mentioned first axis X1, both in the feed direction of the pipe T and in the opposite direction to the feed direction of the pipe.

Preferably, when the cutting apparatus 1 moves in the feed direction of the pipe, it moves in synchrony with the pipe T.

Figure 6:
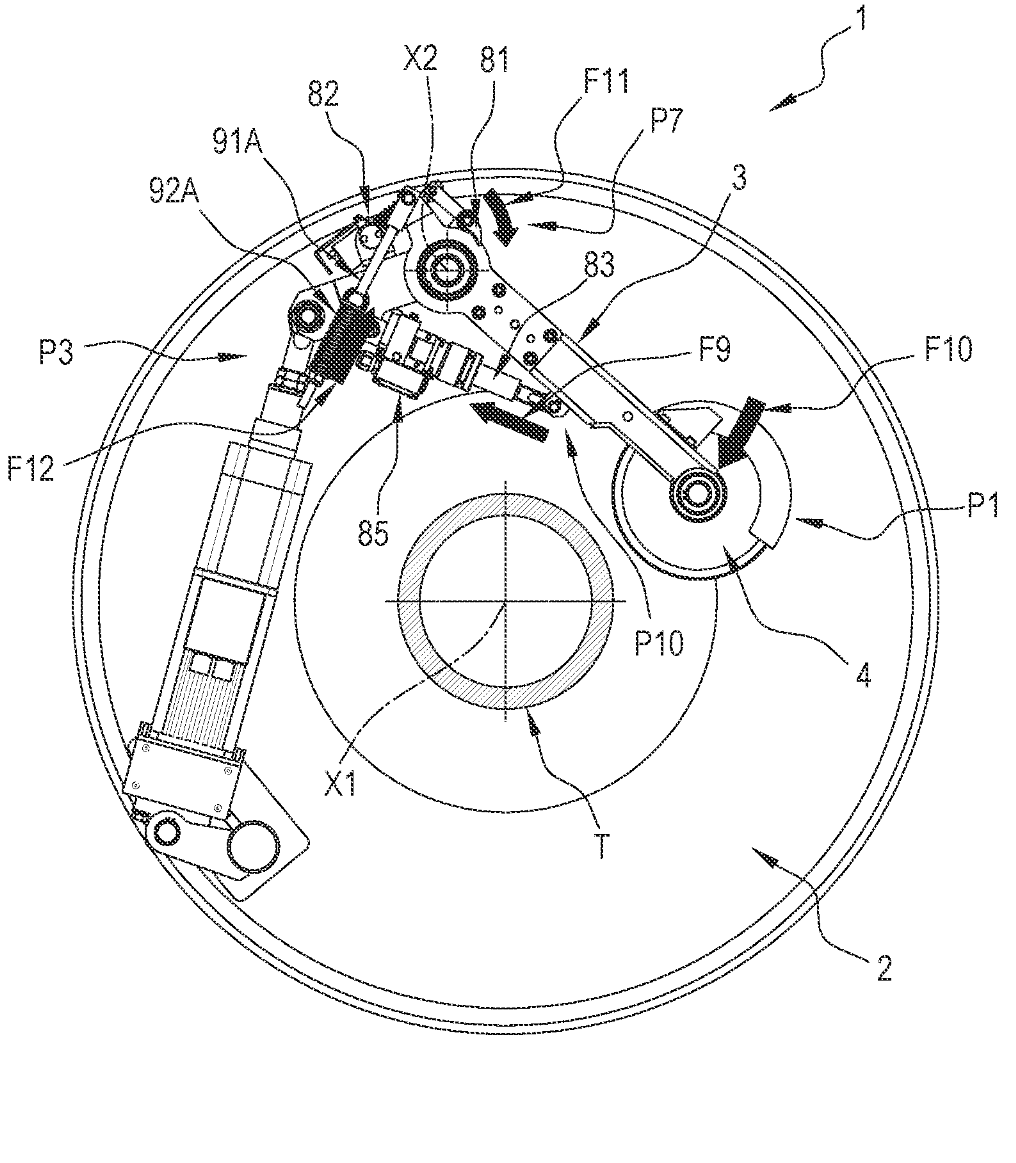
Figure 7:
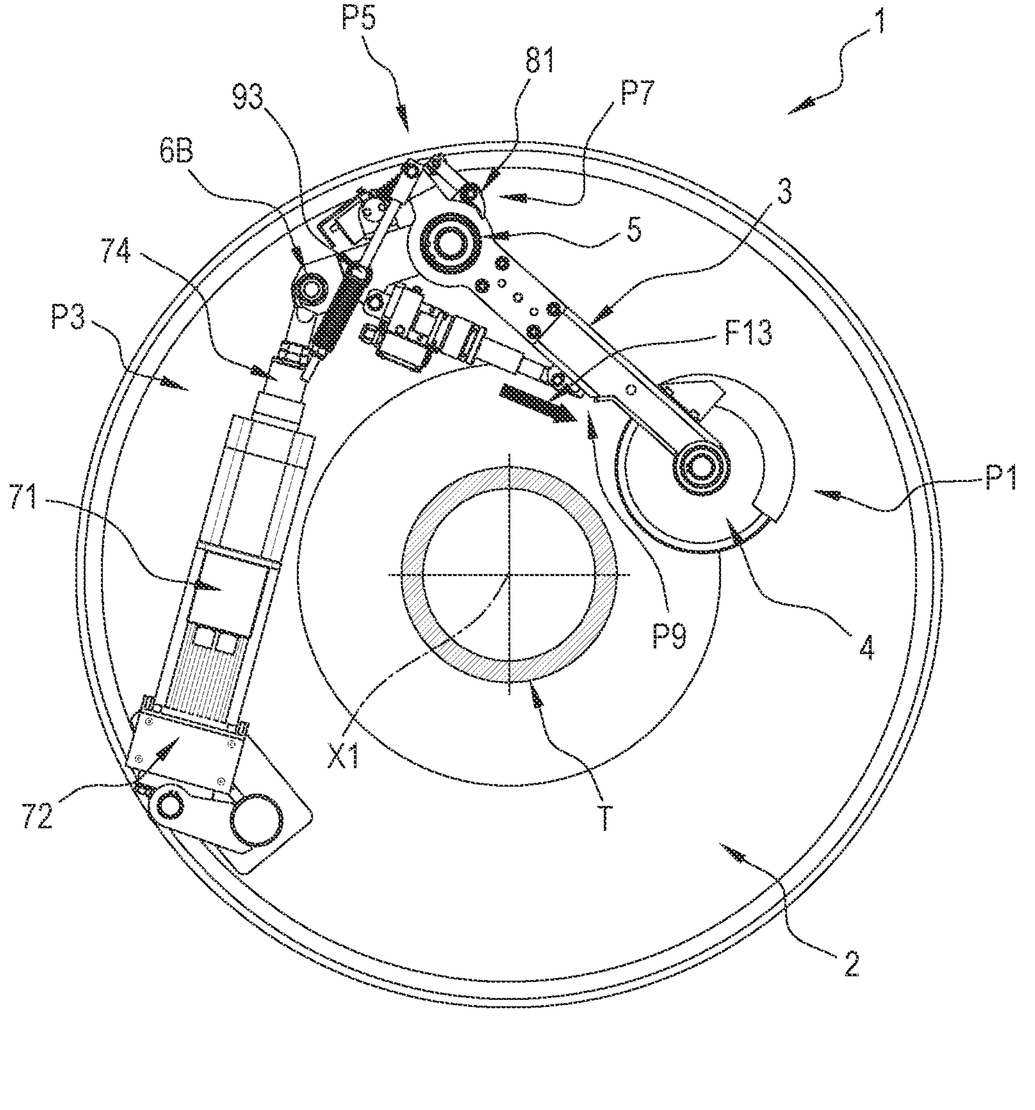
Figure 8:
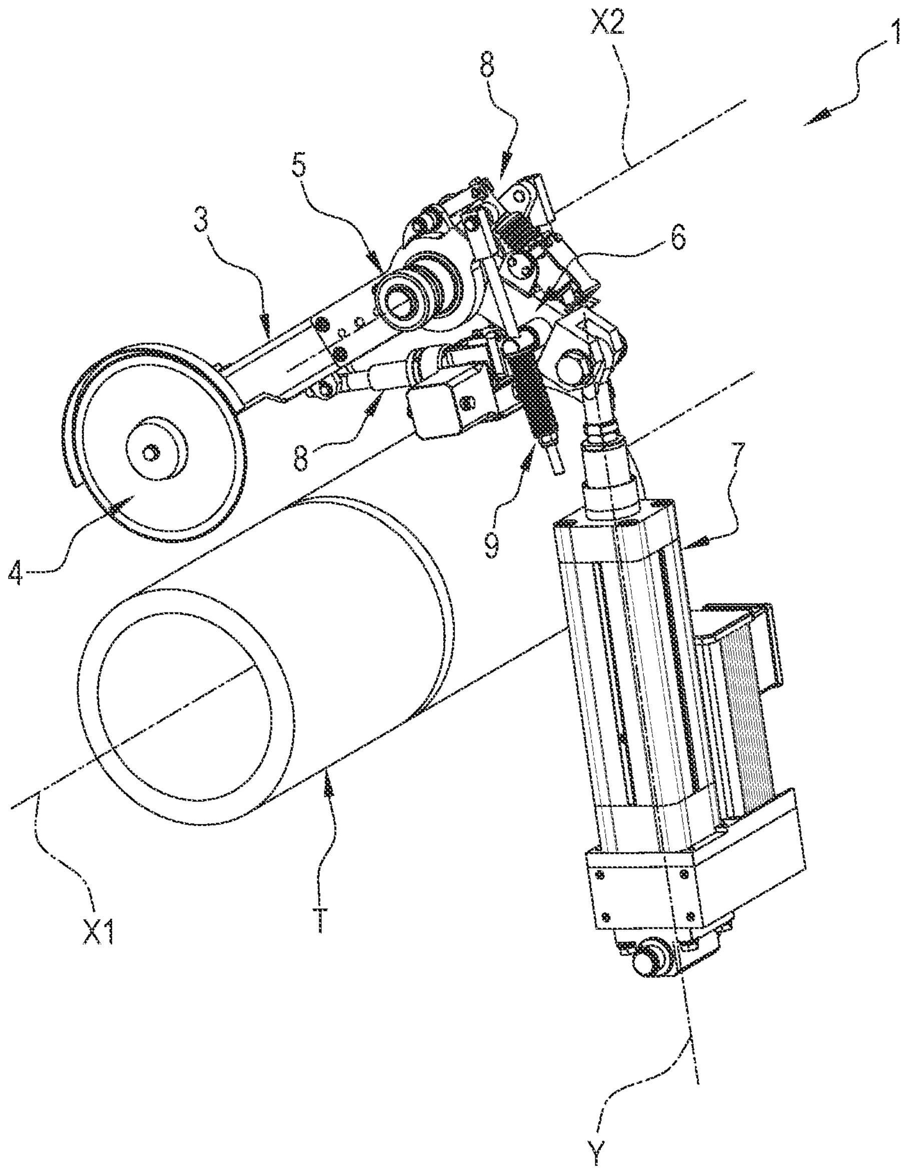
FIG. 8 is a perspective view of the cutting apparatus of FIGS. 1 and 2, with some parts cut away for clarity, during the operations for cutting a pipe made from thermoplastic material.

According to the invention, the feed direction of the pipe T comes out of the sheet of FIGS. 1-7 and from left to right according to the perspective of FIG. 8.

As illustrated in the accompanying drawings, the cutting apparatus 1 comprises an arm 3.

Again as illustrated, the arm 3 supports, at a first free end 3A, a cutting tool 4.

In other words, the cutting tool 4 is pivoted on the arm 3 at the first free end 3A.

In the embodiment illustrated in the accompanying drawings, the cutting tool 4 is an idle circular blade.

In another embodiment not illustrated, the cutting tool 4 is a fixed blade, also called the knife blade.

According to yet another embodiment not illustrated, the cutting tool 4 is a circular motor-driven blade, suitably equipped with suitable means for driving the blade.

According to one aspect, the arm 3 is movable around a pin 5.

According to an embodiment, the pin 5 is integral with the rotatable structure 2.

As illustrated in the accompanying drawings, the arm 3 is pivoted about the pin 5, preferably at a second free end 3B, opposite the first free end 3A.

According to another aspect, the arm 3 is movable in a rotational direction about the pin 5.

In the embodiment illustrated, the arm 3 is pivoted on the pin 5 to rotate about a second axis X2.

Preferably, the second axis X2 is parallel to the above-mentioned first axis X1 of rotation of the rotatable structure 2.

More specifically, the arm 3 is movable between a non-operating configuration P1, at which said tool 4 is disengaged from said pipe T, and an operating configuration P2, where the tool 4 is engaged in said pipe T to exert its cutting action.

In other words, in the non-operating configuration P1, the tool 4 does not make contact with the pipe T, as illustrated for example in FIG. 1.

Figure 2:
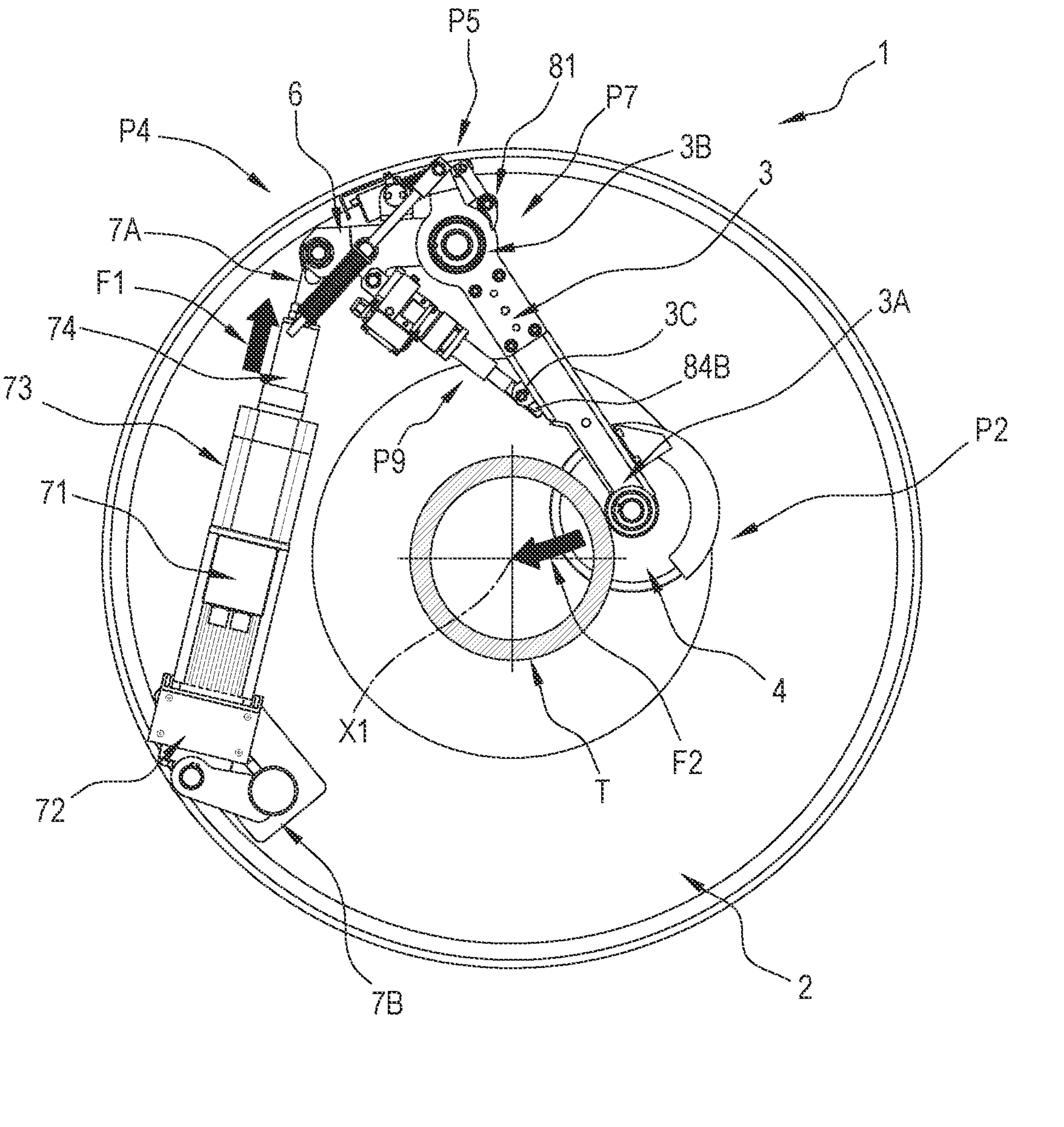

On the other hand, in the operating configuration P2, the tool 4 interferes with the pipe T for exerting the cutting action, as illustrated for example in FIG. 2.

Again as illustrated, the cutting apparatus 1 comprises a lever 6.

Preferably, the lever 6 is movable in a rotational direction about the pin 5.

As illustrated in the accompanying drawings, the lever 6 is pivoted about the pin 5, preferably at a first free end 6A.

In the embodiment illustrated, the lever 6 is pivoted on the pin 5 to rotate about the second axis X2.

More specifically, the lever 6 is movable between a rest configuration P3 and an active configuration P4.

More specifically, the distinction between the rest configuration P3 and the active configuration P4 lies in the distance from the first axis X1 of a second free end 6B, opposite the first free end 6A, of the lever 6.

In the rest configuration P3, illustrated in FIG. 1, the second free end 6B of the lever 6 is closer to the first axis X1 than it is in the active configuration P4, illustrated in FIG. 2.

As illustrated in FIG. 8, the cutting apparatus 1 comprises a supporting device 7.

Said supporting device 7 extends longitudinally along a longitudinal axis Y and has two respective longitudinally opposite ends 7A, 7B, one upper and the other lower.

Said supporting device 7 is operatively connected to the lever 6.

According to the embodiment illustrated, the supporting device 7 is connected to the lever 6, preferably by a pivot, at its upper end 7A.

Similarly, the lever 6 is connected to the supporting device 7, preferably by the above-mentioned pivot, at its free end 6B.

Preferably, at its lower end 7B, the supporting device 7 is in turn pivoted on the above-mentioned rotatable structure 2, preferably by means of a respective pin for rotating about an axis parallel to the second axis X2.

According to one aspect, the supporting device 7 comprises a supporting body 72.

Preferably, the supporting body 72 is positioned at the lower end 7B of the supporting device 7.

Again preferably, the supporting body 72 represents the connection point of the supporting device 7 with the rotatable structure 2.

The supporting body 72 is configured for moving the other elements of the supporting device 7.

According to another aspect, the supporting device 7 comprises a first electric actuator 71.

Advantageously, the use of an electric actuator makes it possible to keep limited the overall dimensions and weight with respect to another type of actuator, for example a hydraulic or pneumatic actuator which would require, for example, the installation in, or close to, the rotatable structure 2 of hydraulic or pneumatic control units, respectively.

Again advantageously, the use of an electric actuator guarantees a greater precision of action and an easier adjustment of this action, even in terms of speed and force.

Preferably, the first electric actuator 71 is supported by the supporting body 72 and represents the point of connection to the lever 6.

In effect, as illustrated, the first electric actuator 71 extends from the supporting body 72 to the upper end 7A.

Preferably, the first electric actuator 71 is a linear electric actuator.

Still more preferably, the first electric actuator 71 is configured to exert its action along a direction parallel to or coinciding with the longitudinal axis Y of the supporting device 7.

As illustrated, the first electric actuator 71 advantageously comprises a body 73 for housing the electro-mechanical apparatuses.

The first electric actuator 71 comprises a rod 74, emerging from the body 73 and designed to move longitudinally along the above-mentioned longitudinal axis Y.

The rod 74 defines, with a relative end protruding from the body 73, the above-mentioned upper end 7A of the supporting device 7.

According to an embodiment, the first electric actuator 71 comprises the use of an electro-mechanical jack.

Preferably, the first electric actuator 71 comprises a lead nut and screw system and an electric motor for moving the rod 74 along the longitudinal axis Y.

According to one aspect of this invention, the supporting device 7, and more specifically the first actuator 71, is configured to move, preferably by means of the rod 74, the lever 6 between said rest configuration P3 and the active configuration P4.

More specifically, due to the action of the first actuator 71, the rod 74 is movable between a retracted position, illustrated in FIG. 1 and at which the rod 74 is mainly contained in the body 73, and an extended position, illustrated in FIG. 2 and at which the rod 74 is mainly exposed (that is, emerging) from the body 73.

The action of the first actuator 71 which allows the rod 74 to pass from the retracted position to the extended position is represented by the arrow F1 in FIG. 2.

Figure 5:
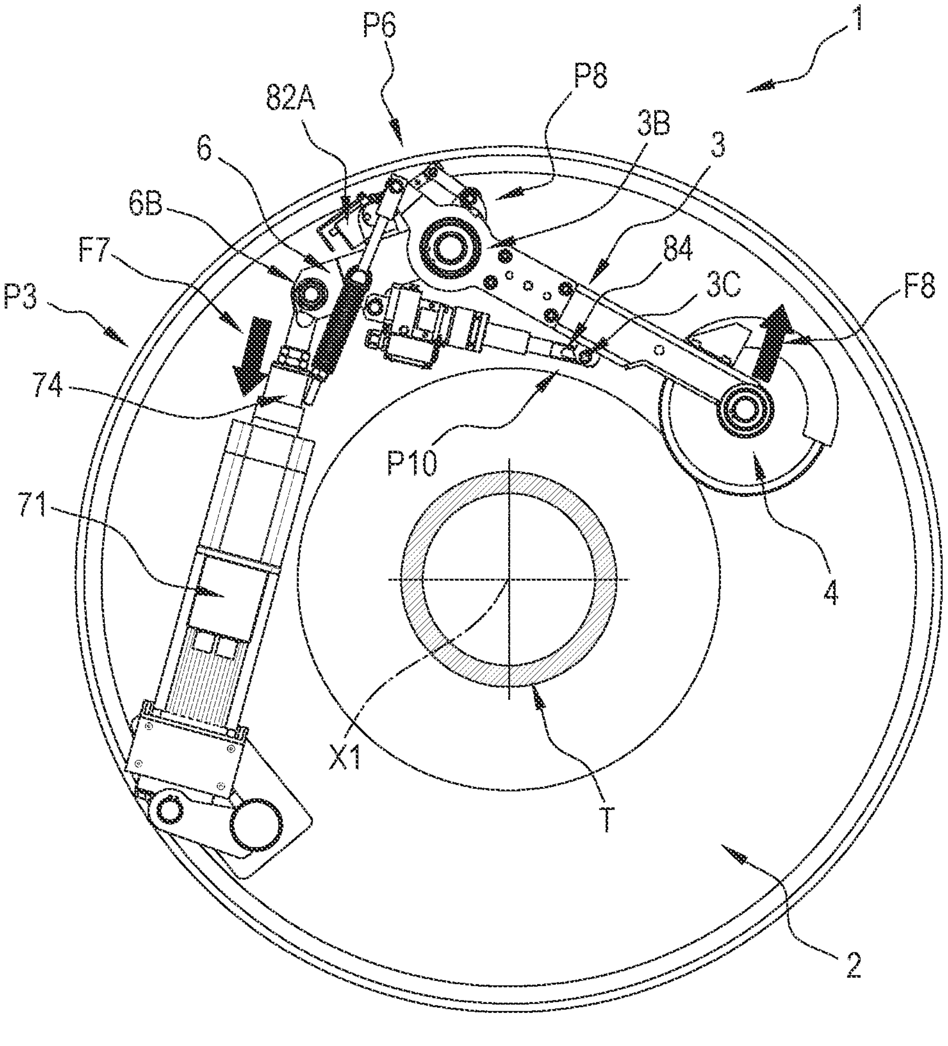

The action of the first actuator 71 which allows the rod 74 to pass from the extended position to the retracted position is represented by the arrow F7 in FIG. 5.

According to another aspect of this description, the cutting apparatus 1 comprises a locking unit 8.

The locking unit 8 is operatively connected to the arm 3 and to the lever 6.

The locking unit 8 is movable between an engaged configuration P5 and a free configuration P6.

When the locking unit 8 is in the engaged configuration P5, the arm 3 and the lever 6 are integral with each other.

More specifically, if the locking unit 8 adopts the engaged configuration P5, a reciprocal rotation is not allowed between the arm 3 and the lever 6, as illustrated in the embodiment of FIGS. 1, 2 and 7, 8.

In this configuration, the arm 3 and the lever 6 substantially constitute, in their entirety, a rocker arm, that is to say, a single body rotating about the pin 5 under the action of the first electric actuator 71.

When the locking unit 8 is in the free configuration P6, the arm 3 and the lever 6 are, on the other hand, movable relative to each other.

Figure 4:
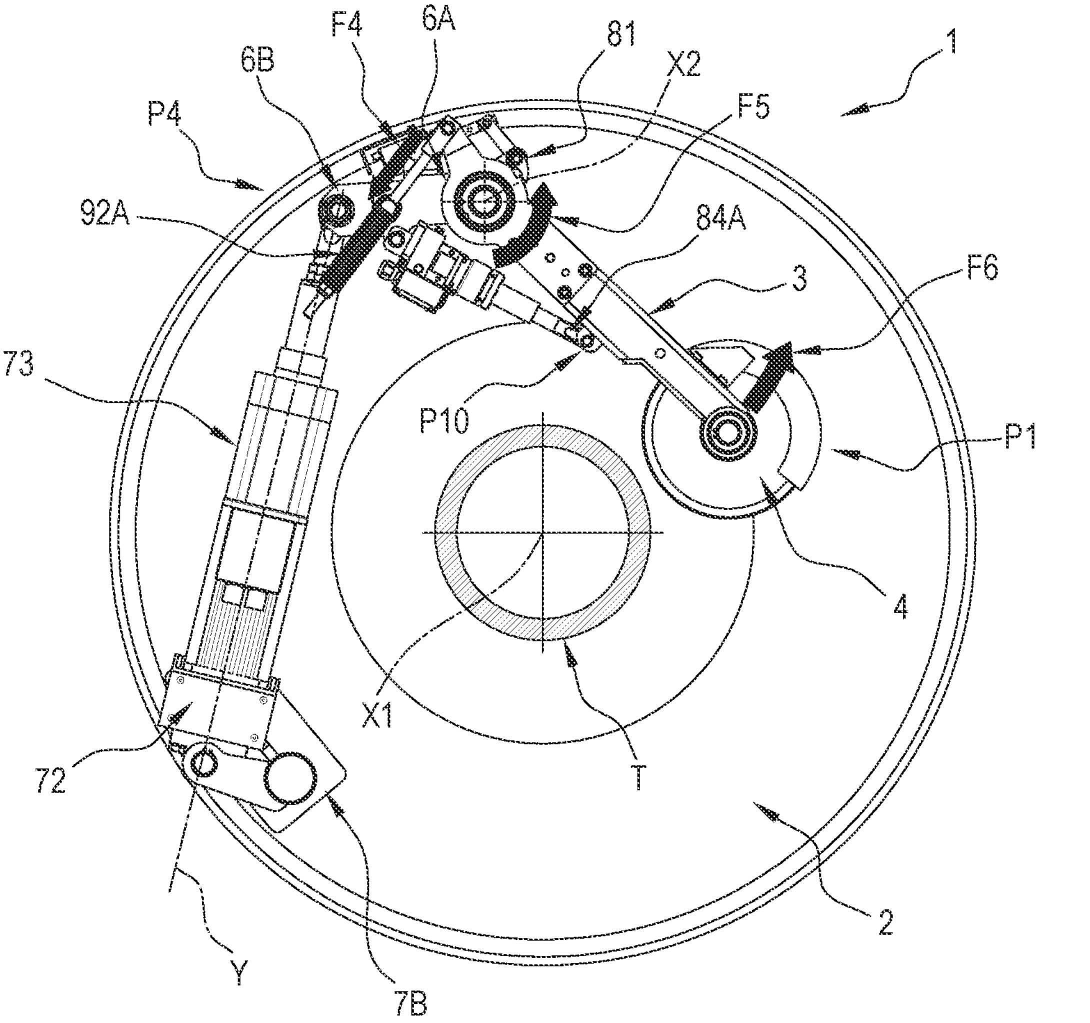

More specifically, if the locking unit 8 adopts the free configuration P6, a reciprocal rotation is allowed between the arm 3 and the lever 6, as illustrated in the embodiment of FIGS. 4, 5.

In the embodiment illustrated, when the locking unit 8 adopts the free configuration P6, the arm 3 can rotate about the pin 5 relative to the lever 6, as illustrated for example in FIG. 4 by the arrow F5.

Preferably, the locking unit 8 comprises a contact element 81.

According to an embodiment, the contact element 81 has a beak or tooth shape.

The contact element 81 is connected, preferably by a pin, in a movable fashion to the lever 6.

More specifically, the contact element 81 rotates between a locked position P7 and a released position P8.

More specifically, when the contact element 81 is in the locked position P7, the contact element 81 is engaged with said arm 3 to prevent it, at least partially, from rotating freely relative to the above-mentioned lever 6.

In the embodiment illustrated by way of example in FIG. 1, the contact element 81 comes into contact, at a free end of it, with a contact seat of the arm 3.

This contact between the contact element 81 and the contact seat of the arm 3 prevents, at least partially, free rotation between the arm 3 itself and the lever 6.

In the embodiment illustrated in FIGS. 1 to 7, the contact between the contact element 81 and the contact seat of the arm 3 prevents rotation of the arm 3 in an anticlockwise direction relative to the lever 6.

According to another aspect, when the contact element 81 is in the release position P8, the contact element 81 is not engaged with said arm 3 and allows, at least partially, free rotation relative to above-mentioned lever 6.

Figure 3:
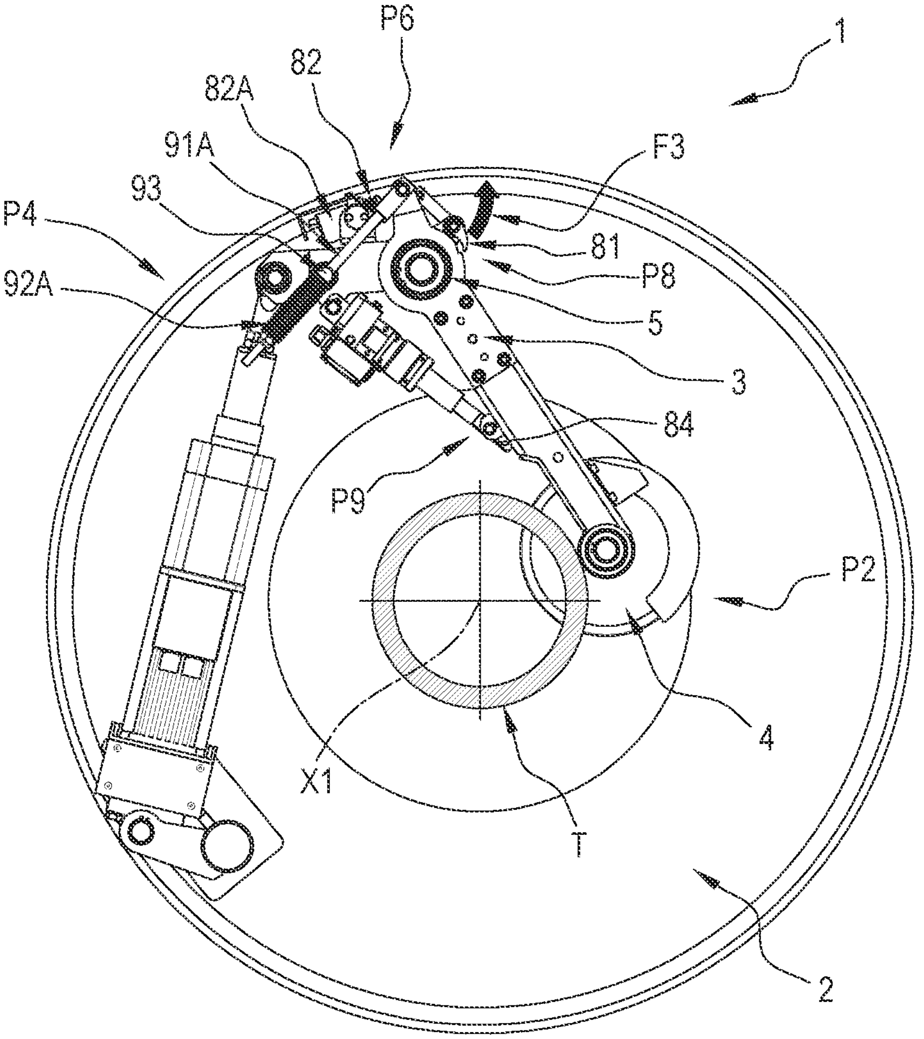
FIGS. 3 to 7 are front views of the cutting apparatus of FIGS. 1 and 2 in different configurations corresponding to the steps of managing an emergency.

In the embodiment illustrated by way of example in FIG. 3, the contact element 81 does not come into contact, at the above-mentioned free end, with the contact seat of the arm 3 being in the release position P8.

The lack of contact between the contact element 81 and the contact seat of the arm 3 allows, at least partially, free rotation in one direction between the arm 3 itself and the lever 6.

As illustrated in FIG. 4 through the arrow F5, the lack of contact between the contact element 81 and the contact seat of the arm 3 allows the arm 3 to rotate in an anticlockwise direction relative to the lever 6.

Preferably, the locking unit 8 comprises a second actuator 82.

According to an embodiment, the second actuator 82 is an electro-mechanical actuator.

Advantageously, the second actuator 82 is operatively connected to the contact element 81.

Preferably, the second actuator 82 is connected to the contact element 81 at an end of it opposite the contact end of the contact seat of the arm 3.

According to one aspect of this invention, the second actuator 82 is configured to move the contact element 81 between the locked position P7 and the released position P8.

In the embodiment shown in the accompanying drawings, the second actuator 82 is movable between a locked configuration, wherein the contact element is kept in the locked position P7, and a released configuration, wherein the contact element is kept in the released position P8.

In the embodiment illustrated in FIGS. 1-2 and 6-8, the second actuator 82 is in the locked configuration, that is to say, extended, so as to keep the contact element 81 in the locked position P7, that is to say, in the contact seat of the arm 3.

In the embodiment illustrated in FIGS. 3-5, the second actuator 82 is in the released configuration, that is to say, retracted, so as to keep the contact element 81 in the released position P8, that is to say, outside the contact seat of the arm 3.

The passage from the locked configuration to the released configuration causes the rotation of the contact element 81, which protrudes from the contact seat of the arm 3 as shown by the arrow F3 in FIG. 3.

In the embodiment illustrated in FIGS. 3-5, the passage from the released configuration to the locked configuration causes the rotation of the contact element 81, which enters from the contact seat of the arm 3 as indicated by the arrow F11 in FIG. 6.

In alternative embodiments, not illustrated, the contact element 81 comprises a fixed pin, located on the arm 3 or on the lever 6, which intercepts a special seat, located on the lever 6 or on the arm 3 depending on the position of the contact element 81, in the locked position P7 and protrudes from it in the released position P8.

Preferably, the locking unit 8 comprises a secondary power supply device 82A for powering the second actuator 82.

According to an embodiment, the secondary power supply device 82A is a battery, which is able to store the energy sufficient for driving the second actuator 82.

The secondary power supply device 82A may be, more generally speaking, any device designed for storing energy sufficient for driving the second actuator 82; said secondary power supply device 82A may be located at any position and may be defined by one or more elements.

Advantageously, the use of the secondary power supply device 82A allows operation of the second actuator 82 even if there is no primary electricity supply.

Preferably, the locking unit 8 comprises a reset rod 83.

Said reset rod 83 is connected to the arm 3 and to the lever 6.

In the embodiment shown in the accompanying drawings, the reset rod 83 is equipped with a slot 84.

Preferably, the slot 84 has an elongate shape, as illustrated for example in FIG. 1.

Preferably, the arm 3 comprises a pin 3C connecting to said reset rod 83, which is slidably inserted in the slot 84.

In other words, the slot 84 acts as a guide for the sliding of the connecting pin 3C, which is thus inserted with clearance in the slot 84 itself.

More specifically, the connecting pin 3C is movable between a first position P9 where it substantially abuts a first end 84A of the slot 84 and a second position P10 where it substantially abuts a second end 84*b* of the slot 84.

In this description, the term "substantially abuts" is used since it might not make actual contact between the connecting pin 3C and the first end 84A at the first position P9 or the second end 84B at the second position P10.

If no contact is made between the connecting pin 3C and the first end 84A in the first position P9 or the second end 84B in the second position P10, the first position P9 is a position of the connecting pin 3C close to the first end 84A of the slot 84 and the second position P10 is a position of the connecting pin 3C close to the second end 84*b* of the slot 84.

In effect, the presence of other resistant elements prevents movement of the connecting pin 3C before coming into contact with one of either said first end 84A or second end 84B, as described in more detail below.

In the embodiment shown in the accompanying drawings, the first end 84A of the slot 84 is further spaced from the arm 3 than the second end 84B of the slot.

More specifically, when the connecting pin 3C is in the first position P9, the free rotation in one direction between the arm 3 and the lever 6 is prevented at least partially.

In the embodiment illustrated in the accompanying drawings, when the connecting pin 3C is in the first position P9, rotation of the arm 3 in a clockwise direction ("clockwise" with reference to FIGS. 1 to 7) relative to the lever 6 is prevented.

Thus, the simultaneous presence of the contact element 81 in the locked position P7 and of the connecting pin 3C in the first position P9 (which can correspond to the action of suitable resistant elements as described) prevents the free rotation of the arm 3 relative to the lever 6, both clockwise and anticlockwise.

In this situation, the arm 3 is integral with the lever 6 and both contribute towards forming a rocker arm.

Preferably, the locking unit 8 comprises a third actuator 85.

According to an embodiment, the third actuator 85 is an electro-mechanical actuator.

According to one aspect of this invention, the third actuator 85 is operatively connected to the reset rod 83.

According to one aspect, the third actuator 85 is configured to move the reset rod 83.

More specifically, the third actuator 85 is configured to return the arm 3 relative to the lever 6 to the initial relative position before the free rotation due to the released position of the contact element 81.

In effect, with the occurrence of said released condition of the contact element 81, the connecting pin 3C has passed from the first position P9 to the second position P10.

The third actuator 85 is also configured to move the reset rod 83 to bring the connecting pin 3C from the contact condition of the second end 84B to the contact condition of the first end 84A.

The action of the third actuator 85 is illustrated in FIGS. 6 and 7, more specifically by the arrows F9 and F13 in the respective drawings.

The action of the third actuator 85 is described in more detail below.

Advantageously, the use of electric actuators in the locking unit 8 allows the overall dimensions and the weight to be kept limited.

Again advantageously, the use of electric actuators in the locking unit 8 guarantees a greater precision of action and an easier adjustment of this action.

According to another aspect of the invention, the cutting apparatus 1 comprises disengagement means 9.

The disengagement means 9 are configured to move the arm 3 from the operating position P2 to the non-operating position P1.

In other words, the disengagement means 9 are configured for moving the cutting tool 4, by means of the arm 3 which carries it, from a condition for engaging with the pipe T to a condition of disengagement from the pipe.

Preferably, the disengagement means 9 comprise at least one connecting element 91, connected to the lever 6 and to the arm 3.

The longitudinal extension of the connecting element 91 defines the direction of a disengagement action generated by the disengagement means 9.

In one embodiment, illustrated in the accompanying drawings, the connecting element 91 comprises at least one bar 91A.

Said bar 91A is rotatably connected to the arm 3, at one end of it.

At its opposite end, the bar 91A is connected to the lever 6 by a constraining element 93 preferably in a rotatable fashion.

Preferably, the constraining element 93 is represented by a bushing.

Advantageously, the use of a bushing allows a relative movement between the lever 6 and the bar 91A, which slides inside the bushing.

Preferably, the disengagement means 9 comprise at least one energy storage element 92.

Said energy storage element 92 is, preferably, operatively connected to the connecting element 91.

According to an embodiment, the energy storage element 92 is configured for storing mechanical energy.

According to another embodiment, the energy storage element 92 is configured for storing electricity.

According to an embodiment, the energy storage element 92 is configured for storing magnetic energy.

More specifically, the energy storage element 92 is configured to keep a quantity of energy stored when the locking unit 8 is in the engaged configuration P5.

Moreover, the energy storage element 92 is configured for freeing said quantity of energy stored when the locking unit 8 is in the free configuration P6.

According to the embodiment shown in the accompanying drawings, the energy storage element 92 is a spring 92A.

According to one embodiment, said spring 92A is a helical spring.

The spring 92A is, therefore, configured for storing elastic energy when the locking unit 8 is in the engaged configuration P5 and for freeing said elastic energy when the locking unit 8 is in the free configuration P6.

Preferably, said spring 92A is fitted on the bar 91A.

Again preferably, the spring 92A acts between one end of the bar 91A and the constraining element 93 of the bar with the lever 6.

In the embodiment illustrated in the accompanying drawings, the spring 92A acts between the free lower end of the bar 91A and the bushing, having the constraining element 93.

The spring 92A is also movable between a compressed condition, as shown for example in FIG. 1, when the locking unit 8 is in the engaged configuration P5 and an extended condition, as shown for example in FIG. 4, when the locking unit 8 is in the free configuration P6.

In the embodiment shown in the accompanying drawings, the resistance to compression of the spring 92A when it is already in the compressed position prevents the connecting pin 3C from coming into contact with the first end 84A of the slot 84 when it is in the first position P9.

In other words, when the connecting pin 3C is at the first position P9, there is gap between the pin itself and the first end 84A of the slot 84.

According to alternative embodiments, the disengagement means 9 comprise torsion springs, preferably fitted on the pin 5, with the twisting axis preferably coinciding with the second axis X2.

The operation of the cutting apparatus 1 is described below, with the aid of the accompanying drawings, both in optimum working conditions and under conditions for managing a malfunction.

Without limiting the scope of the invention, reference will be made below, in a non-limiting example, to the embodiment of the apparatus 1 illustrated in the accompanying drawings. It should be understood that replacing some components of the apparatus 1 with equivalent elements does not affect the validity of the following.

In use, as illustrated in FIG. 1, the cutting apparatus 1 is in a standby condition, before starting a new cutting process on the pipe 2 made of thermoplastic material from the above-mentioned and not illustrated extrusion station.

In the waiting condition shown in FIG. 1, the arm 3 of the apparatus 1 is in the non-operating configuration P1, the lever in the rest configuration P3 and the locking unit 8 in the engaged configuration P5.

More specifically, the contact element 81 is in the locked position P7 and the connecting pin 3C is in the second position P9, so as to constrain the arm 3 to the lever 6.

With regard to the supporting device 7, the rod 74 is retracted inside the body 73, so as to keep the lever 6 in the rest configuration P3.

The spring 92A is pre-compressed and fitted on the bar 91A.

The spring 92A maintains the compressed condition whilst the locking unit 8 remains in the engaged configuration P5.

In order to cut the pipe T, the first electric actuator 71 is activated, which moves the rod 74 by the action indicated by the arrow F1 illustrated in FIG. 2, to bring it to the extended position.

In that way, the lever 6 is moved from the rest configuration P3 to the active configuration P4.

Since the locking unit 8 maintains the engaged configuration P5, the arm 3 moves, in an integral fashion with the lever 6, from the non-operating configuration P1 to the operating configuration P2, as shown by the arrow F2 in FIG. 2.

In this position, the tool 4 comes into contact with the pipe T to exert its cutting action.

The fact that, during cutting of the pipe T, the rotatable structure 2 (and the cutting apparatus 1 integral with it)

rotates about the first axis X1 will not be taken into consideration in this description and will not therefore be described in detail.

However, it must be understood that, in the cutting operations, the structure 2 performs at least one rotation of 360° about the first axis X1.

If the cutting process is performed normally, the cutting tool 4 completely cuts the pipe T as illustrated in FIG. 8.

An action by the first electric actuator 71 equal and opposite to that indicated by the arrow F1 is necessary to return the apparatus 1 to the waiting condition shown in FIG. 1.

However, should a fault exist, such as, for example, an emergency stoppage or interruption of the electricity supply, the first electric actuator 71 would not be able to move the apparatus 1 to the standby position, disengaging the tool 4 from the pipe T, unless the apparatus 1 is equipped with a non-economic and cumbersome system for storing energy (UPS), which would overcome the absence of mains power, supplying directly the first actuator 71 to reverse the motion.

The feeding of the pipe T would not be stopped and it would continue its motion, even only by inertia.

Due to the engagement condition with the tool 4, the longitudinal movement of the pipe T would be transmitted to the apparatus 1, with consequent damage to the apparatus.

In order, therefore, to disengage the cutting tool 4, the second actuator 82 passes from the locked configuration (that is, extended) to the release configuration (that is, a retracted) and commands the movement of the contact element 81 from the locked position P7 to the released position P8, as shown by the arrow F3 in FIG. 3.

Advantageously, the second actuator 82 exerts its action in a pulse-like fashion.

Following the movement of the contact element 81, the locking unit 8 is in the free configuration P6, where the reciprocal rotation between the arm 3 and the lever 6 is allowed.

With the locking means 8 in the free configuration P6, the spring 92A can free the elastic energy stored and pass from the compressed configuration to the extended configuration, as shown by the arrow F4 in FIG. 4.

Following the extension of the spring 92A, the bar 91A slides in the bushing, representing the constraining element 93.

This sliding acts on the arm 3, which is dragged as a result of the sliding of the bar 91A, rotating as indicated by the arrow F5 in FIG. 4.

The stroke of this movement is limited by the longitudinal extension of the slot 84, despite the presence of additional mechanical resistive elements (described below) in such a way that the connecting pin 3C may not come into contact with said first and second ends 84A and 84B of the slot 84.

In effect, following the rotation of the arm 3, the connecting pin 3C passes from the first position P9 to the second position P10, thereby moving close to the second end 84B of the slot 84.

Preferably, the rotation of the arm 3 represented by the arrow F5 is limited by a mechanical contact element, not illustrated, between the arm 3 and the lever 6.

The rotation shown by the arrow F5 moves the arm 3 to the non-operating configuration P1 and moves the cutting tool 4 away from the pipe T, disengaging it completely from it, as shown by the arrow F6 in FIG. 4.

In this situation, the cutting apparatus 1 is placed in safety and does not undergo damage due to the feeding of the pipe T.

Following the resolving of the fault situation, and therefore when the electricity returns to supplying the components of the apparatus 1, the apparatus must be returned to the waiting condition of FIG. 1 so as to be able to continue its operation, that is to say, cut subsequent sections of the pipe being extruded.

The first electric actuator 71 moves the rod 74 by the action indicated by the arrow F7 of FIG. 5 to bring it to the retracted position and, consequently, to bring the lever 6 to the rest configuration P3.

This movement produces a further moving away of the cutting tool 4 from the pipe T, represented by the arrow F8 in FIG. 5.

In this condition, the third actuator 85 then moves the reset rod 83 as indicated by the arrow F9 in FIG. 6.

In other words, the third actuator 85 moves the reset rod 83 towards the lever 6.

Since the connecting pin 3C is in the second position P10, the arm 3 is driven by the locking rod 73 and rotated as indicated by the arrow F10, while remaining in the non-operating position P1.

Rotation of the arm 3 returns the contact element 81, which is still to the released position P8, to the contact seat of the arm 3.

The second actuator 82 passes from the released configuration (that is, retracted) to the locked configuration (that is, extended) and controls the movement of the contact element 81 from the released position P8 to the locked position P7, as shown by the arrow F11 in FIG. 6.

At the same time, following the action of the third actuator 85, the spring 92A is returned to the compressed configuration and the bar 91A slides in the direction indicated by the arrow F12 in FIG. 6.

The spring 92A returns to storing elastic energy, which will be released again when a new emergency condition is reached.

The third actuator 85 again moves the reset rod 83 as indicated by the arrow F13 of FIG. 7, moving the connecting pin 3C to the first position P9, so as to allow, if necessary, a new possibility of rotation of 3 relative to the lever 6, now having the pin 3C to again position the entire sliding length inside the slot 84.

The configuration adopted by the cutting tool 1 in FIG. 7 substantially coincides with the waiting condition illustrated in FIG. 1 and the tool 1 is ready to restart the cutting operations, with the conditions of FIG. 1 and FIG. 2.

The cutting apparatus 1 according to the invention achieves the preset aims and brings important advantages.

A first advantage connected with the cutting apparatus 1 is due to the possibility, in the case of a power supply fault, of disengaging in a quick and safe manner the cutting apparatus 1 from the pipe being processed, guaranteeing maximum safety.

Another advantage is due to the fact of having adopted an electric drive, instead of the hydraulic or pneumatic actuation of the cutting tool known in the prior art.

The use of electric actuators makes the apparatus in its entirety more compact and lighter, as well as more versatile and simpler in terms of both installation and maintenance.

Moreover, the use of electric actuators results in optimisation of the cutting operations, thanks to the greater intrinsic precision of the electric drive if compared with hydraulic or pneumatic drive operation.

It is also, thanks to the use of electric actuators, very simple to adjust the cutting action, differentiating the radial speeds of the tool relative to the pipe between the step of moving towards and the cutting step or varying and controlling in a continuous fashion the force and the speed of penetration of the tool, as required, for example, for particular plastic materials so as to avoid unwanted fragile breakage of the pipe or poor quality of the cuts made.

Being able to control the cutting process with the usual movement systems (pneumatic or hydraulic) in such a dynamic and immediate fashion is prohibitive both in terms of excessive constructional complexity and less control precision.

The invention claimed is:

1. An apparatus for cutting pipes made of thermoplastic material in automatic cutter machines, comprising:

a cutting tool for cutting pipes made of thermoplastic material, an arm, which carries said cutting tool, and movable in a rotational direction about a pin between a non-operating configuration, at which said cutting tool is disengaged from said pipe, at which said cutting tool is engaged with said pipe to exert a cutting action, a lever movable in a rotational direction about said pin between a rest configuration and an active configuration;

a supporting device, operatively connected to said lever for moving the lever between said rest configuration and active configuration, said supporting device comprising a first electric actuator and a supporting body of said first electric actuator; and a locking unit operatively connected to the arm and to the lever and movable between an engaged configuration, at which said arm and said lever are made integral with each other by a constraint defined by said locking unit, and a free configuration, at which said arm and said lever are movable relative to each other; disengagement means configured to move said arm from the operating configuration to the non-operating configuration, when the locking unit is in the free configuration.

2. The apparatus according to claim 1, wherein the locking unit comprises a contact element, connected in a movable fashion to said lever, movable between a locked position, wherein the contact element is engaged with said arm to prevent free rotation relative to the above-mentioned lever, and a released position, wherein the contact element is not engaged with said arm to allow the free rotation of said arm relative to the lever.

3. The apparatus according to claim 2, wherein the locking unit comprises a second actuator, operatively connected to the contact element and configured for moving said contact element between the locked position and the released position.

4. The apparatus according to claim 2, wherein the locking unit comprises a reset rod, connected to the arm and to the lever and including a slot, and wherein the arm comprises a connecting pin inserted slidably inside the slot.

5. The apparatus according to claim 4, wherein the locking unit comprises a third actuator configured at least for moving said reset rod and moving the connecting pin from a first position, wherein the connecting pin comes into contact with a first end of the slot, to a second position, wherein the connecting pin comes into contact with a second end of the slot.

6. The apparatus according to claim 1, wherein the disengagement means comprise at least one connecting element, connected to the lever and to the arm, and at least one energy storage means.

7. The apparatus according to claim 6, wherein the energy storage means are configured to keep an energy stored when the locking unit is in the engaged configuration and to free the energy stored when the locking unit is in the free configuration.

8. The apparatus according to claim 6, wherein the connecting element comprises at least one bar, rotatably connected to the arm and slidably connected to the lever by a constraining element, and wherein the energy storage element is a spring, fitted on the bar and acting between the constraining element and an end of the bar.

9. The apparatus according to claim 1, wherein the locking unit comprises a secondary supply device for supplying energy to the second actuator.

10. The apparatus according to claim 1, and further comprising a rotary structure with an annular shape, which carries the supporting device and is movable in a rotary direction about a first central axis of rotation.

11. The apparatus according to claim 10, wherein the connecting pin between the arm and the lever is integral with the rotary structure.

12. The apparatus according to claim 1, wherein the first electric actuator is a linear actuator, said first electric actuator comprising an electric motor and a lead nut and screw system for moving the lever.

* * * * *